June 20, 1939.   L. C. RONEY   2,163,132

MANIFOLD VALVE

Filed April 6, 1938

LEONARD C. RONEY,
INVENTOR.

BY

ATTORNEY

Patented June 20, 1939

2,163,132

UNITED STATES PATENT OFFICE 2,163,132

MANIFOLD VALVE

Leonard C. Roney, Los Angeles, Calif., assignor to L. C. Roney, Inc., Los Angeles, Calif., a corporation of California Application April 6, 1938, Serial No. 200,402

12 Claims. (Cl. 277—20)

My invention relates in general to manifold valves of the type employed for the connection of pressure cylinders into pressure gas systems, and relates in particular to a manifold which includes valve means of simple and effective form for connecting either one or both of a pair of pressure cylinders to the supply line of a pressure gas system.

Although the use of the invention is not limited, it is considered of especial utility in gas systems wherein the gas used is obtained under pressure in cylinders and is released from these cylinders into a supply system through a pressure regulator. In such gas systems, means are ordinarily provided for the connection of at least two pressure cylinders to the inlet pipe of the system which leads to the pressure regulator, and with such connecting means a valve arrangement is employed which will make it possible to keep either one of the cylinders in open communication with the inlet of the system while the other of the cylinders is being replaced. It is of course essential that the valves employed be so made as to not leak to the exterior, and in my present invention I use a flexible diaphragm for sealing the manifold body against leakage.

It is an object of the present invention to provide a manifold having internal valve means with an external operating means as a handle, and having operative connection with the interior through a diaphragm seal, which valve means is so constructed that wear sustaining parts thereof may be replaced without the need for disassembling the diaphragm supporting structure.

It is a further object of the invention to provide a valve structure of the general character described, having an external handle mounted so as to have rotative movement and simple means extending into the body of the valve and being so formed and supported in operative connection with the operating handle and the movable valve element within the valve body as to convert the rotative movement of the handle to a receprocating movement of the valve element.

A further object of the invention is to provide a valve of the above character wherein the movement of the operating handle is transmitted through a spring member which produces a positive engagement of the valve closure members with their cooperating seats and compensates for any wear which may occur between the movable parts and which may occur between the valve closure members and the valve seats. A feature of this construction is that therein are avoided the difficulties and abuses encountered in mechanically operated, positive leverage valves.

A further important feature of the invention is that the pressure of the valve closure member against the valve seat is determined by the characteristics of the spring through which pressure is transmitted from the operating handle to the valve closure member, the result being that the closure member can never be driven against the seat with the operator's maximum strength as can be done in the ordinary type of valve in which there is a rigid mechanical connection between the operating lever and the closure member. Accordingly, in my present invention neither the closure member nor the valve seat can be injured in this manner.

It is a further object of the invention to provide a valve having a closure member which has a reciprocating movement to and from engagement with the valve seat, a rotatable operating handle, and a circumductory connection for transmitting movement of the handle to the closure member.

A further object of the invention is to provide a valve device having a valve body with a closure member therein, an external operating member, and a circumductory linkage between the operating member and the closure member, there being a positive and permanent seal around the circumductory linkage where it passes to the exterior of the valve body to connect with the externally placed operating member.

A feature of the present invention is that there is no definite closed position of the operating handle for either of the valves. In the preferred form of the dual valve, the valve ports are diametrally opposed and the operating handle is so arranged that it will point toward the valve seat which is open, or away from the valve seat which is closed, but the handle may be disposed anywhere within an arc of 75 degrees on either side of a centralized position and still maintain the relative open and closed relation of the two valves.

Further features of the invention are that it permits of the use of a relatively resilient material in closure members which engage the valve seats; permits the ready changing of valve seats in the field and likewise the replacement of valve nozzles at small expense in event of damage to the same; cannot leak to the exterior around the gyratory or circumductory valve stem for the reason that the same is sealed with a permanent diaphragm; and has means for trapping such foreign matter as may be displaced or scraped from the surface of the valve closure member, such foreign material being thereby prevented from passing from the valve manifold to the pressure regulator.

Further objects and advantages of the invention will be brought out in the following part of the specification.

Referring to the drawing which is for illustrative purposes only:

Figure 1:
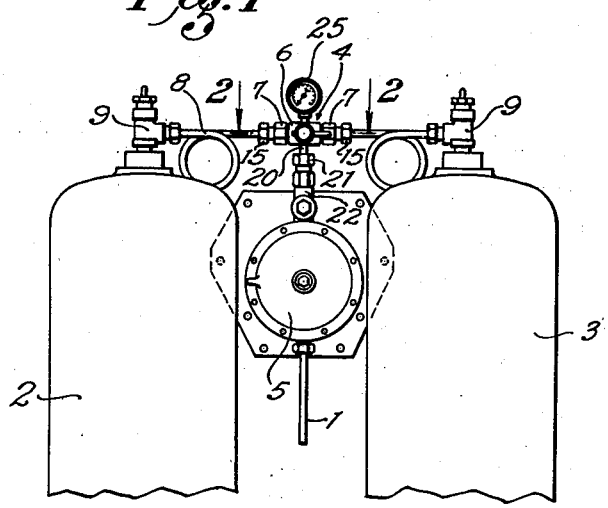
Fig. 1 is a view showing a manner of use of the invention.

In Fig. 1 I show a supply line 1 of a gas distributing system which receives gas from a cylinder 2 or a cylinder 3, or from both of them simultaneously, through a manifold 4 and a pressure regulator 5. The manifold 4 includes a body 6 having a connection 7 at each end thereof for the attachment of tubes 8 which lead to the valves 9 of the cylinders 2 and 3.

Figure 2:
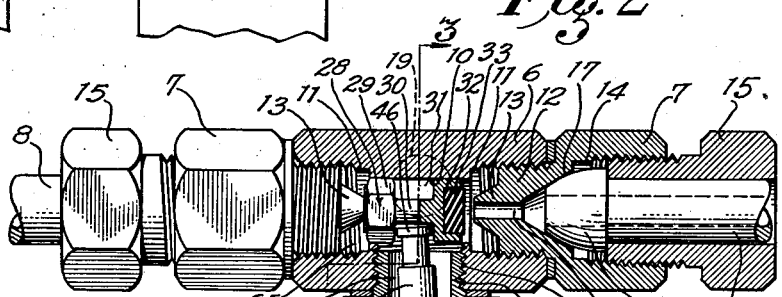
Fig. 2 is an enlarged sectional view taken as indicated by the line 2—2 of Fig. 1.
Figure 3:
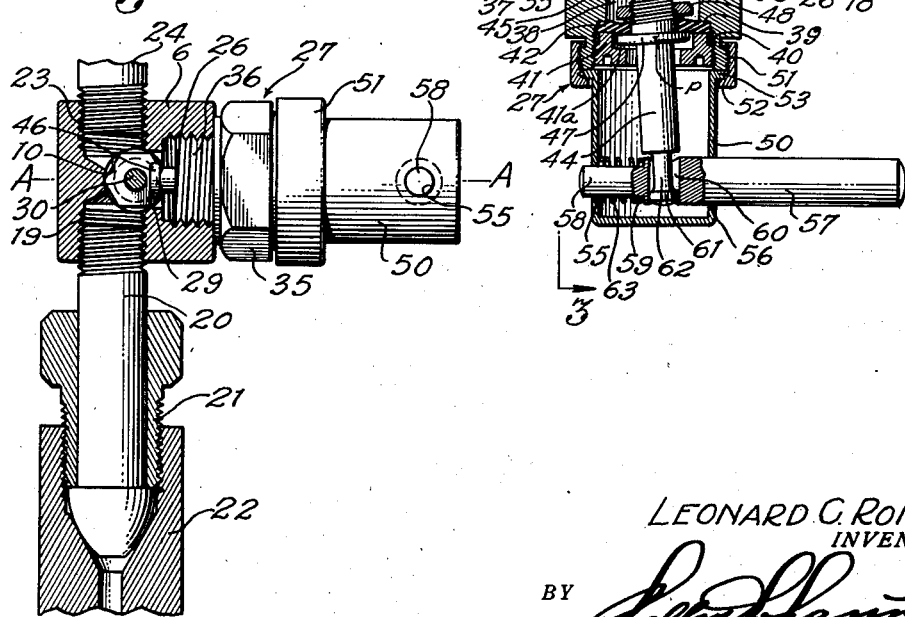
Fig. 3 is an enlarged fragmentary section taken as indicated by the line 3—3 of Fig. 2.

As shown in Figs. 2 and 3, the valve body 6 has a central cylindrical chamber 10, the ends of which communicate with threaded counterbores 11, disposed at the opposite ends of the body 6 and adapted to receive replaceable seat fittings 12 having inwardly faced valve seats 13 of nozzle form. The fittings 12 are provided with external, threaded counterbores 14, into which screw bushings 15 which surround the end portions of the connecting tubes 8 and have the function of forcibly seating the tube-ends 16 in fluid tight engagement with the conical seals 17 are provided therefor at the bottoms of the counterbores 14. The valve seat fittings 12 have axial openings 18 forming gas inlet passages leading from the tubes 8 into the valve chamber 10.

The body 6 has a threaded outlet port 19 leading downwardly from the chamber 10 in a plane which is substantially perpendicular to the longitudinal axis of the valve body 6. By means of a nipple 20 and a connector bushing 21 the outlet port 19 of the valve body 6 is connected to the inlet member 22 of the pressure regulator 5. The valve body 6 may be provided with a second port 23, to receive a nipple 24 for connecting a pressure gauge 25 with the chamber 10.

On an axis A—A, Fig. 3, the valve body 6 is provided with a threaded opening 26 which leads into the chamber 10, the axis A—A preferably being substantially perpendicular to the axis of the body 6 and likewise being substantially perpendicular to the axis defined by the members 20 and 24. The threaded opening 26 provides for the connection of a valve actuating assembly 27 to the body 6, in such a manner that the entire assembly 27 may be bodily removed from the body 6 without disturbing its sealing diaphragm 42, thereby making it possible in a simple manner to disassemble the manifold structure sufficiently to permit replacement of a moveable valve member 28 which is slidably contained in the chamber 10. The valve member 28 consists of a pair of polygonal heads 29 connected by a shank 30 which lies within a peripheral groove 31 in the valve member 28 substantially centrally between the ends thereof. The heads 29 of the valve member 28 are provided with outwardly faced recesses 32 which hold closure members 33, of a material suitable for sealing engagement with the valve seats 13 which are of nozzle form as described.

The valve actuating assembly 27 includes a body or fitting 35 having a threaded projection 36 which screws into the threaded opening 26. As shown in Fig. 2, an opening 37 passes through the projection 36 so as to connect the chamber 10 of the body 6 with a chamber 38 in the body 35. The chamber 38 is of cylindrical cross-section and is separated by a radial shoulder 39 from a threaded counterbore 40 which receives a threaded bushing 41 adapted to compress a peripheral portion of a diaphragm 42 against the shoulder 39. The bushing 41 has an inwardly faced recess 41a. The diaphragm 42 is made from a flexible, leak-proof and gas resistant material, such as "Duprene" for example, and serves as a seal for a stem 44 having an inner portion 45 which passes through the opening 37 and is provided with a head 46 positioned so as to engage the channel 31 of the valve member 28. The stem 44 passes substantially centrally through the diaphragm 42 and is provided with a flange 47 which lies in the recess 41a of the bushing 41 and engages the outer face of a diaphragm 42. A flat nut 48 is threaded onto the inner portion of the stem 44 so as to tightly clamp the internal portion of the diaphragm 42 against the flange 47, thereby forming a tight seal between the diaphragm 42 and the stem 44.

A cup-like member 50 is rotatably secured to the outer end of the body 35 by means of a collar 51 which threads onto such body and is provided with an inwardly projecting flange 52 to enclose a radial flange 53 formed at the inner end of the cup member 50. The cup member 50 may be rotated on the axis A—A, and near the outer end thereof this cup member 50 is provided with diametrically opposed openings 55 and 56, the opening 56 preferably being larger than the opening 55. A handle 57 is provided which is turned down for a short distance to form a stem 58 of such diameter that it will pass through the opening 55 when the handle is caused to enter the member 50 through the larger opening 56. The stem 58 joins the remainder of the handle 57 at a shoulder 59, and adjacent this shoulder an opening 60 is formed in the handle 57 to receive the head 61 at the outer end of a reduced portion 62 which constitutes the outer extremity of the stem 44. A compression spring 63, placed between the shoulder 59 and wall of the member 50 in which the smaller opening 55 is formed, forces the handle 57 outwardly with relation to the member 50, and likewise forces the outer end of the stem 44 toward the side of the cup-member 50 having the opening 56 therein. Accordingly, the action of the spring is to rotate the stem 44 in anti-clockwise direction, as viewed in Fig. 2, thereby causing the head 46 at the inner end of the stem 44 to engage the left hand head 29 of the valve member 28 and force the same into engagement with the left hand valve seat 13, at a pressure which is determined by the strength of the spring 63.

Rotation of the handle 57 and the member 50 on the axis A—A will cause the stem 44 to have circumductory movement around a point of circumduction, such as the point P. By the term circumduction we mean that the ends of the stem 44 move through circular paths while an intermediate point of the stem 44 remains on the point of circumduction P. Accordingly, rotation of the handle 57 through an angle of substantially 180 degrees so that it will point to the left instead of to the right, will cause circumduction of the stem 44 into a position wherein its head 46 will bear against the right hand head 29 of the valve member 28 and force the right hand closure body 33 into sealing engagement with the right hand valve seat 13. Rotation of the handle through an angle of 90 degrees from the position in which it is shown in Fig. 2, to an intermediate position, will swing the stem 44 into an intermediate position wherein the valve member 28 will be supported in spaced relation to both valve seats 13, and accordingly, both of the gas inlet passages 18 will be opened, thereby admitting gas from both cylinders 2 and 3.

It will be perceived that in the construction shown, the handle 57 points toward the cylinder which is in open communication with the valve chamber 10. Accordingly, when the handle 57 is faced to the right, as shown in Figs. 1 and 2, the cylinder 3 will be connected through the valve chamber 10 with the pressure regulator 5, and the valve element leading to the cylinder 2 will be closed, so that the cylinder 2 may be disconnected from the manifold, as for purpose of replacement, without interrupting the supply of gas from the cylinder 3 to the gas distributing system. This condition will be reversed by rotating the handle 57 through an angle substantially 180 degrees from the position in which it is shown in Figs. 1 and 2.

Owing to the fact that circumduction of the stem 44 causes the head 46 at its inner end to pass through a circular orbit around the axis A—A, the handle may be disaligned from the position in which it is shown in Fig. 1 through a relatively large angle before the head 46 will be moved out of engagement with the left hand valve head 29, this effect being contributed to by the fact that the disalignment of the stem 44 from the axis A—A is accomplished by the spring 63 which will act to hold the head 46 in engagement with the left hand valve head 29 until the handle is swung either right or left to and through an angle of substantially 75 degrees from the position thereof shown in Fig. 1. Accordingly, there is no definite "off" position of the handle 57 for either of the two valves incorporated within the manifold 4, and also the operator cannot cramp the valve in either position thereof for the reason that the pressure which may be applied through the stem 44 to the valve member 28 is limited by the strength of the spring 63. The inner end spaces 65 of the counterbores 11 form receptacles or traps into which foreign substances removed from the exposed faces of the closure members 33 may be retained, so that the same will not be carried through the valve chamber 10 into the pressure regulator 5.

It will be recognized that form is not the substance of the invention, but that certain changes may be made in the structure disclosed without departing from the principles of the invention disclosed; accordingly, the invention is not limited to the details of the disclosure and should be accorded the full scope of the appended claims.

I claim as my invention:

1. In a manifold valve of the character described, the combination of: a body having a pair of valve openings; closure means so formed that by alternate movement it will close one and then the other of said openings; a rotary member operable from the exterior of said body; a gyratory member connecting said rotary member with said closure means and operating to receive movement from said rotary member and transmit the same to said closure means so as to produce said alternate movement of said closure means whereby one or the other of said openings may be selectively closed; and spring means disposed so as to apply force to said gyratory member in such direction that the force derived from said spring will be transmitted through said gyratory member to said closure means.

2. In a valve of the character described, the combination of: a body having a pair of valve openings; closure means for said opening, said closure means including a part adapted to be reciprocated along an established line of movement; a rotary actuating member disposed on an axis of rotation placed in transverse relation to said line of movement; means operatively connecting said part to said rotary actuating member and transforming the rotary movement of said actuating member to reciprocating movement of said part of said closure means; and spring means applying its force to said connecting means so that the force of said spring means will be transmitted through said connecting means to said closure means to urge the same into closing relation to said valve openings.

3. In a manifold valve of the character described, the combination of: a body having a pair of valve openings; closure means so formed that by alternate movement it will close one and then the other of said openings; a rotary member operable from the exterior of said body; a circumductory member connecting said rotary member with said closure means and operating to receive movement from said rotary member and transmit the same to said closure means so as to produce said alternate movement of said closure means whereby one or the other of said openings may be closed; and a diaphragm supported on an intermediate portion of said circumductory member and having its peripheral portion connected to said valve body, whereby said diaphragm will seal between said circumductory member and said body.

4. In a manifold valve of the character described, the combination of: a valve body having a valve opening; a closure member in said body adapted to be reciprocated to and from closing position to said opening; a rotary member on the exterior of said body; and a circumductory member extending from said rotary member into said body and having connection therein with said closure member, rotation of said rotary member producing circumduction of said circumductory member so that the connection at the inner end thereof will move said closure member; and a diaphragm secured on an intermediate portion of said circumductory member and having its periphery connected to said body so as to form a seal between said circumductory member and said body permitting circumduction of said circumductory member.

5. In a manifold valve of the character described, the combination of: a body having a valve opening; a closure member in said body adapted to be moved from open to closed relation to said opening; and a valve actuating assembly secured to said valve body, said assembly comprising an outer rotary part adapted to be manually rotated, a circumductory stem extending from said rotary part into said valve body to engage said valve closure member, and a diaphragm secured on an intermediate portion of said circumductory stem and having its peripheral portion engaged so that such diaphragm will seal around said circumductory stem while at the same time permitting circumduction thereof.

6. In a manifold valve of the character described, the combination of: a valve casing having a valve port and an opening therein; a closure member in said casing adapted to be moved between open and closed relation to said valve port; and a valve actuating assembly securable to said casing in communication with said opening, said assembly comprising a body with an aperture therethrough, gyratory means extending through said aperture so that when said assembly is secured to said casing the inner end of said gyratory means will be in operative engagement with said closure member, a flexible diaphragm extending across said aperture and having sealed connection with said gyratory means, a rotary member forming an outer part of said assembly, and resilient means for imparting movement to said gyratory means from said rotary member.

7. In a manifold valve of the character described, the combination of: a valve casing having a valve port and an opening therein; a closure member in said casing adapted to be moved between open and closed relation to said valve port; and a valve actuating assembly securable to said casing in communication with said opening, said assembly comprising a body with an aperture therethrough, gyratory means extending through said aperture so that when said assembly is secured to said casing the inner end of said gyratory means will be in operative engagement with said closure member, a flexible diaphragm extending across said aperture and having sealed connection with said gyratory means, a cup member mounted on said body so as to rotate, said cup member enclosing the outer portion of said gyratory means, and a spring mounted member carried by said cup member in transverse relation thereto, said spring mounted member engaging said gyratory means so as to impart gyratory movement thereto when said cup member is rotated.

8. In a manifold valve of the character described, the combination of: a valve casing having a valve port and an opening therein; a closure member in said casing adapted to be moved between open and closed relation to said valve port; and a valve actuating assembly comprising a body with an aperture therethrough securable to said casing in communication with said opening, actuating means extending through said aperture so that when said body is secured to said casing the inner end of said actuating means will be in operative engagement with said closure member, a flexible diaphragm extending across said aperture and having sealed connection with said gyratory means, and rotary means carried by said body and being connected to said actuating means so as to impart movement thereto, and means carried by said body and being formed so as to resist outward movement of said actuating means under pressure from the interior of said valve casing.

9. In a manifold valve of the character described, the combination of: a valve body having a valve opening; a valve closure member in said body adapted to be moved to and from closed relation to said valve opening; circumductory means extending outwardly from said body, there being means connecting the inner end of said circumductory means to said closure member so that the circumductory movement thereof will move said closure member into closing relation to said valve opening; a diaphragm tight on said circumductory means, the periphery thereof being in sealing engagement with said valve body; means engaging an intermediate portion of said circumductory means so as to define a point of circumduction and to limit radial movement of the intermediate portion of said circumductory means; and a rotary actuating member carried by said body exterior of said diaphragm, said rotary member engaging the outer end of said circumductory means so that its rotation will impart circumductory movement to said circumductory means.

10. In a manifold valve of the character described, the combination of: a body having a valve opening; a closure member for said opening supported in said valve body so as to be moved to and from said opening along an established line of movement; a rotary actuating member disposed on an axis of rotation in transverse relation to said line of movement; a diaphragm supported by said body in a position crossing said axis; circumductory means having a part projecting through said diaphragm, the inner end of said circumductory means having operative connection with said closure member whereby circumduction of said circumductory means will move said closure member into closing relation to said opening; and yieldable means connecting said rotary actuating member to the outer end of said circumductory means so as to swing said outer end around an axis of circumduction and to urge said outer end radially outward from said axis of circumduction.

11. In a manifold valve of the character described, the combination of: a body having a valve opening; a closure member for said opening supported in said valve body so as to be moved to and from said opening along an established line of movement; a rotary actuating member disposed on an axis of rotation in transverse relation to said line of movement; a diaphragm supported by said body in a position crossing said axis; circumductory means having a part projecting through said diaphragm, the inner end of said circumductory means having operative connection with said closure member whereby circumduction of said circumductory means will move said closure member into closing relation to said opening; means connecting said rotary actuating member to the outer end of said circumductory means so as to swing the same around an axis of circumduction; and a spring member supported so as to revolve with said rotary actuating member and to apply a radial force to said circumductory means.

12. In a manifold valve of the character described, the combination of: a valve body having a valve opening; a valve closure member in said body adapted to be moved to and from closed relation to said valve opening; circumductory means extending outwardly from said body, there being means connecting the inner end of said circumductory means to said closure member so that the circumductory movement thereof will move said closure member into closing relation to said valve opening; a diaphragm tight on said circumductory means, the periphery thereof being in sealing engagement with said valve body; means engaging an intermediate portion of said circumductory means so as to define a point of circumduction and to limit radial movement of the intermediate portion of said circumductory means; and an actuating member carried by said body exterior of said diaphragm, said actuating member engaging the outer part of said circumductory means so that upon actuation of said actuating member it will impart circumductory movement to said circumductory means.

LEONARD C. RONEY.